(No Model.)
E. A. DODGSON.
POWDER DUSTING MACHINE.
No. 388,184.  Patented Aug. 21, 1888.
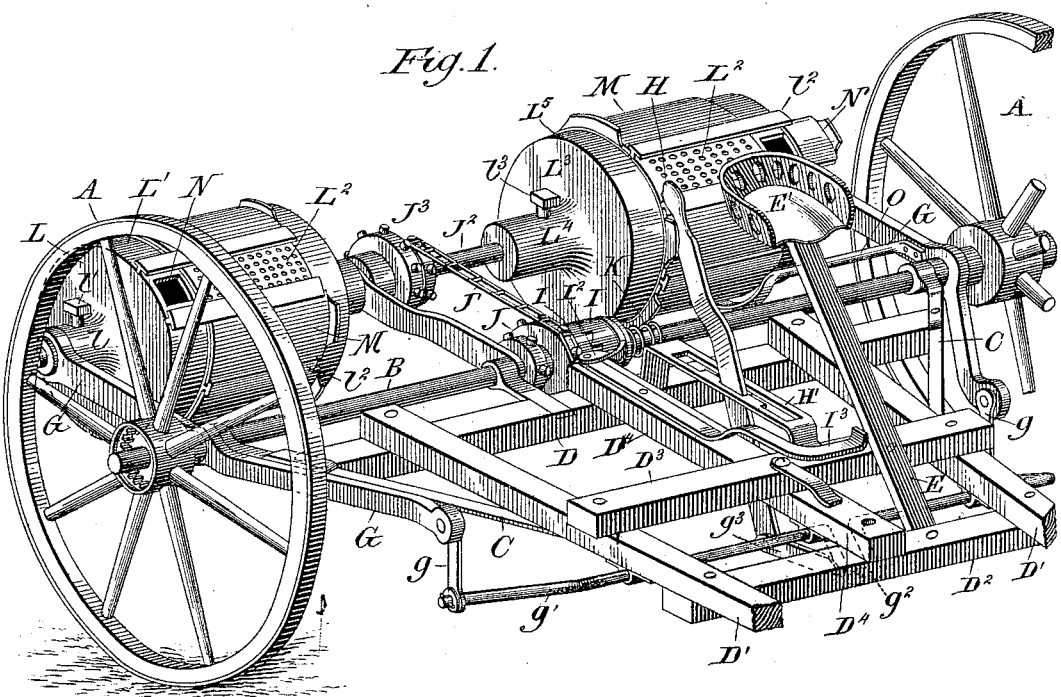
Fig. 1.
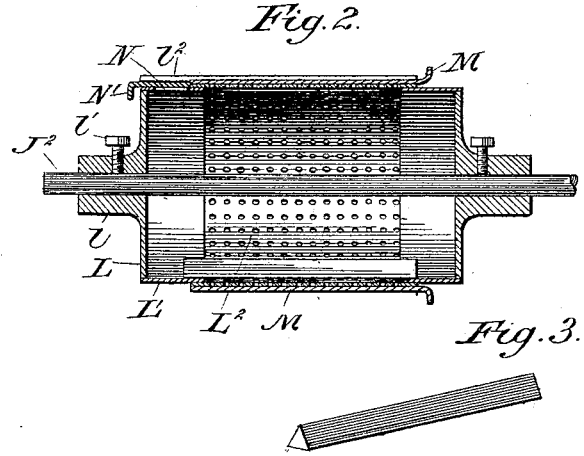
Fig. 2.
Fig. 3.
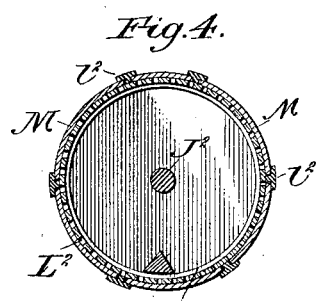
Fig. 4.
Witnesses:
F. W. Ballard
Myron H. Peck Jr.
Inventor.
Earl A. Dodgson.
By G. W. Ford Atty.

UNITED STATES PATENT OFFICE.

EARL A. DODGSON, OF BATAVIA, NEW YORK.

POWDER-DUSTING MACHINE.

SPECIFICATION forming part of Letters Patent No. 388,184, dated August 21, 1888.

Application filed May 28, 1888. Serial No. 275,405. (No model.)

*To all whom it may concern:*

Be it known that I, EARL A. DODGSON, a citizen of the United States, residing at Batavia, in the county of Genesee and State of New York, have invented a new and useful Potato-Vine Sprinkler, of which the following is a specification.

My invention relates to improvements in potato-bug exterminators wherein a powdered compound is used (poisonous in its nature) whereby the insects are destroyed by means of the sifting of the said compound upon the potato-vines in a dry state; and the objects of the improvements are to provide means whereby the compound may be automatically spread upon the vines at stated intervals when the plant is in the hill, or the same may be continuously sifted when the tubers are planted in drills; also to provide means for gaging the lateral flow of the powder to accommodate a large or small plant, giving a sufficient quantity of the poison to insure effective work without waste of material; also to afford facilities for sowing a ground-enriching mixture with the poison—such, for instance, as plaster-stone or gypsum. I attain these objects by the mechanism illustrated in the accompanying drawings, in which—

Figure 1 is a front perspective view, with parts broken away, showing the devices arranged for being drawn by a horse and capable of use for dusting two rows at one time of passing over the ground. Fig. 2 is a longitudinal sectional view taken through the sifting-drum, showing the manner of giving a lateral adjustment for regulating the side flow of compound. Fig. 3 is a detail view of the agitator placed within the drum; and Fig. 4 is a cross-sectional view taken through the center of the sifting-drum, showing the grooved ribs for slides.

Similar letters refer to similar parts throughout the several views.

In the drawings, A represents the carrying-wheels; B, the wheel-axle, which extends the entire width of the carriage, having a wheel upon either end, the said wheels being provided with the usual and well-known clutch mechanism, and so arranged that the axle will revolve in the forward movement of the wheels, but through the intervention of the clutch remaining stationary in the backward movement. To this axle B are sleeved thereon and near the end thereof diagonal draft-irons C, to which is attached the wooden frame-work, consisting of the main cross-beam D, thills D', front cross-bar, D², intermediate cross-bar, D³, and longitudinal tie-bar D⁴, the rear end of the latter being secured to beam D at a point centrally of its length and extending forward sufficiently far to lap over and is secured to the bar D², as well as being bolted to cross-bar D³, which bar rests upon the top side of the longitudinal bar, as well as upon the top side of the thills, the front cross-bar being bolted upon the under side of the said thills and longitudinal bars, so that all the parts of the frame-work are securely united each to the other.

The draft-irons C have eyes at their rear ends, through which eyes the axle passes, turning therein, the draft-irons reaching forward in a diagonal manner sufficiently far for an attachment at their forward ends to the thills, while the main beam at each end is secured to the draft-irons at a point intermediate between the front and rear ends of the draft-irons, so as to form braces as well as draft-irons. A seat-standard, E, carrying seat E', is secured to the frame-work, so that the operator may be seated upon the machine and guiding his horse therefrom. The whiffletree F admits the attaching of the horse to the machine by which it is drawn over the field, as will presently appear. For the purpose of supporting the sifting-drums, (which will be hereinafter described,) I take two metal bars, G, and make a hole centrally through the same of sufficient diameter to allow the axle to turn therein, the bars extending rearwardly at right angles with the axle sufficiently far for supporting the drum-shaft, the ends of which pass through the bars G and also turn therein. These bars G extend forward of the wheel-axle to about the same degree as the rear extension, the said forward ends being inwardly drawn and in close proximity to the side of either thill and having pivoted thereto links g, which connect with the crank-rod g', so that as the crank-rod is rolled in its bearing (which is secured to the wooden frame-work) the bars G are made to rock upon the wheel-axle, causing the rear end carrying the sifting-drums to rise and lower to accommodate the height of the plants to be operated upon, as will presently appear.

In order that the operator from his seat upon the machine may turn the rod $g'$, a central crank, $g^2$, is formed by giving a suitable bend to the rod, so as to provide a bearing, around which is loosely wrapped the forward end of link $g^3$, the rear end of which link is pivoted to the foot of hand-lever H, which in turn is pivoted to bar $D^4$, so that as the hand end of the lever is moved backward or forward the link-connection between the lower end of the lever and the crank-rod $g'$ will cause the said rod to turn in its bearings, thereby tilting the drum-carrying bars, as will be readily understood.

To lock the hand-lever, so as to keep the dusting-drum at any desired height from the ground, the slotted iron H', having notches for the reception of the hand-lever, may be used; or any other well known rack-and-spring-bolt device may be adopted.

In order that the revolution of the sifting-drum may be hindered without stopping the horse, I provide the following clutch-operating mechanism: I take two half-clutches, I I', turn a groove in the part I for the reception of the shifter-fork $I^2$, this half-clutch being made to turn with the wheel-axle by the use of a spline, (or equivalent device,) so that it may be freely moved upon the axle for disconnection with the loose half-clutch I', carrying the sprocket-wheel J, upon which is mounted sprocket-chain J', which in turn drives the shaft $J^2$ through the intervention of sprocket-wheel $J^3$, placed thereupon.

K is a spiral spring placed upon the wheel-axle, one end of which abuts against a pin or other stop attached to the axle, while the reverse end impinges against the half-clutch I, thus keeping the two half-clutches in operative contact. To the shifting-fork $I^2$ by its front end is pivoted the foot-lever $I^3$, which in turn is pivoted to the longitudinal bar $D^4$, upon which pivot the foot-lever is swung so that the side movement of the lever will through its connection with the half-clutch by the shifter-fork cause a like movement of the clutch, but in a reverse direction, throwing the drum mechanism out of gear, and so holding it by the foot of the operator until such times as it shall be desired to operate the sifters, when the foot is removed, the spiral spring by its recoil bringing the two half-clutches in contact, as hereinbefore mentioned.

Referring now to the sifting mechanism, L is a drum-head having attached thereto a hub, $l$, in which hub is screw-threaded set-screw $l'$. Upon the periphery of this drum-head is placed a metallic band, L', extending laterally upon the side reverse from the hub. To this metallic band is secured the perforated shell $L^2$. Upon this perforated shell is attached the longitudinal grooved ribs $l^2$, within which groove the slides M are placed, and having a lateral adjustment therein. $L^3$ is a like head, having hub $L^4$ and set-screw $l^3$, and having also a metallic band, $L^5$, peripherally attached to the head, the parts being so arranged that this band or head L will slide within the open end of the perforated shell, so that the openings therein may be adjustably closed, as will presently appear.

M is a feed-opening made in band L' and covered by slide N', moving in grooves, as hereinabove described.

O is a spring-agitator secured at one end upon bar G, the free end of which impinges circumferentially against the perforated drum, so that as it revolves the spring as it passes the slide-ribs will knock against the perforated shell, thus preventing any clogging of the mixture within the drum. A modification of this spring-agitator is shown in Fig. 3, which consists of a three-square bar of iron, the same being placed within the drum, and as the drum is revolved the bar by gravity finds the lowest place in the drum, the continual falling of which prevents any clogging that might otherwise occur in certain conditions of the mixture, such as dampness, &c.

In practical operation I prefer to use ground gypsum mixed with paris-green for sprinkling the potato-vines—the paris-green to destroy the bugs, the gypsum to aid in the distribution as well as for the enrichment of the vines. This compound is placed within the perforated drum, after which a certain number of slides are withdrawn and the machine moved over the ground in such manner that in the revolution of the drum an opening will be over the hill of vines, through which opening the compound passes in a scattered condition by reason of the minute perforations in the drum-shell. A portion of the closing-slides are quite wide, while others are narrower, so that the entire vine can be sprinkled at any stage of its growth by withdrawing wide or narrow slides. The sprinkling-drums can also be vertically adjusted to suit the height of the plant. The movable drum-head also regulates the lateral flow of material, the head being held in the desired position upon the shaft by the set-screw in the hub. The rate of speed may be adjusted by changing the sprocket-chain to another set of sprocket-wheels, as will be readily seen.

One or more drums may be used upon a single shaft, so that a single row may be sprinkled, or several rows may be accomodated by a single passage over the ground. If desired, a one-wheel vehicle propelled by hand may be used, the same carrying one or more drums.

Having now described my invention, what I claim as new, and desire to secure by Letters Patent, is—

1. In a perforated drum having one end secured to the solid metallic band peripherally attached to the drum-head mounted upon the drum-carrying shaft, the feed-opening in the metallic band, provided with longitudinal ribs upon each side thereof, and the feed-cover inclosing the opening and adapted for sliding in grooves in the ribs, in combination with the drum-operating mechanism, arranged substantially as described, and for the purpose hereinbefore set forth.

2. The drum-head having the hub attached thereto, the set-screw in the hub, the hub-carrying shaft, the peripheral metallic band, the perforated shell, the drum-head made adjustable upon the shaft, the band peripherally attached to the drum-head, and the drum-supporting frame, in combination with the operating mechanism, arranged substantially as described, and for the purpose hereinbefore set forth.

3. The perforated drum, the longitudinal slide-ribs upon the periphery of the same, the feed-distributing slides adjustably held in position by the ribs, the drum-shaft, and the drum-supporting frame, in combination with the operating mechanism, arranged substantially as described, and for the purpose hereinbefore set forth.

4. The perforated drum, the shaft carrying the same and having the sprocket-wheel mounted thereupon, the carrying and operating wheels, and the revolving wheel-axle having the sprocket-wheel and clutch mounted thereupon, in combination with the raising and lowering mechanism, all arranged and operating substantially as described, and for the purpose hereinbefore set forth.

EARL A. DODGSON.

Witnesses:
H. T. MILLER,
G. W. FORD.